(No Model.)
F. W. BUTLER.
CORRODING POT.
No. 564,183. Patented July 21, 1896.
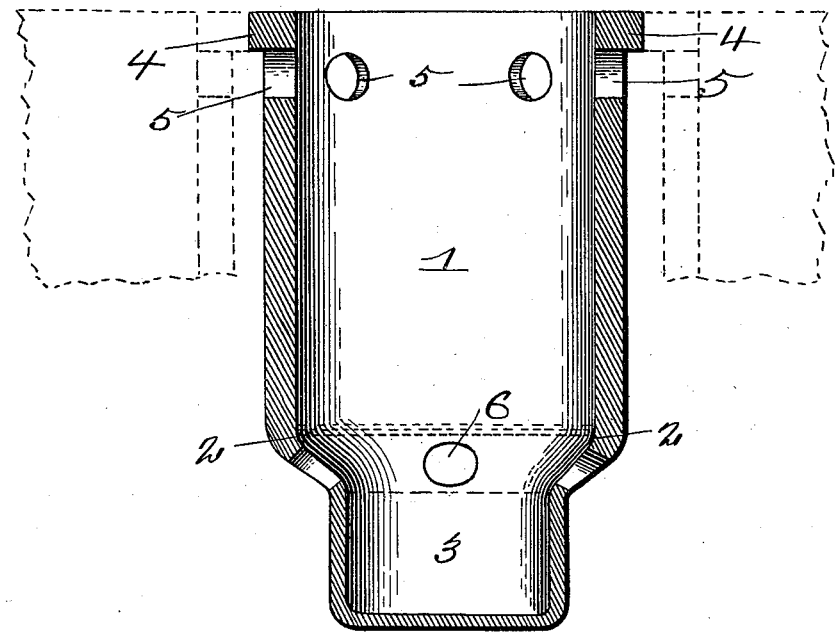
Witnesses.
T. W. Johnson,
Morris Price.
Inventor
F. W. Butler
By J. R. Nottingham
Atty.
THE NORRIS PETERS CO., PHOTO-LITHO., WASHINGTON, D. C.

UNITED STATES PATENT OFFICE.

FREDERICK W. BUTLER, OF AKRON, OHIO, ASSIGNOR TO THE E. H. MERRILL COMPANY, OF SAME PLACE.

CORRODING-POT.

SPECIFICATION forming part of Letters Patent No. 564,183, dated July 21, 1896.

Application filed January 10, 1896. Serial No. 575,009. (No model.)

*To all whom it may concern:*

Be it known that I, FREDERICK W. BUTLER, a citizen of the United States, residing at Akron, in the county of Summit and State of Ohio, have invented certain new and useful Improvements in Corroding-Pots; and I do hereby declare the following to be a full, clear, and exact description of the invention, such as will enable others skilled in the art to which it appertains to make and use the same.

The invention relates to certain new and useful improvements in corroding-pots; and it consists in producing a pot of peculiar shape and providing the same with means for the thorough exposure of the metallic lead buckles which are to be placed in the pot, above the acid-chamber thereof, to the combined action of acetic-acid and carbonic-acid gas, as will be hereinafter more fully described and specifically set forth in the claims.

Heretofore it has been the practice to construct the pots with solid or imperforate walls, without the proper means of ventilation and circulation, but latterly it has been found advantageous to perforate or form recesses in the side wall of the pot for the purpose of permitting the entrance of the carbonic-acid gas; but in practice such pots have been found unsatisfactory, in that the acetic-acid vapor does not rise freely in the pot and the carbonic-acid gas evolved from the fermentable substance, in which the pot is partially embedded, will not readily commingle and diffuse with said vapor.

My invention is particularly designed to overcome these defects, which I do by constructing or forming the pot of such exterior configurations that the upper edges of a series of the same will set closely together, while between the outer sides of their upper or body portions circulating spaces or passages for the carbonic-acid gas will be left, the pot being provided at suitable points below the supported buckles, but above the acid-chamber, with apertures for the entrance of said gas, so that the diffusion of the carbonic-acid gas and acetic-acid vapor may take place in the space or chamber or below the buckles and the mixture of gas and vapor be permitted to rapidly attack the lead.

In the accompanying drawing, the figure represents a vertical sectional view of my improved pot.

Referring specifically to the figure, the numeral 1 indicates a corroding-pot constructed according to my invention. The pot is formed preferably of earthenware, and is cylindrical in shape, being contracted to form an internal shoulder 2 for the support of the buckles and a chamber 3 for holding the acetic acid. At the upper edge the pot is provided with an external flange 4 for the purpose hereinafter described, and below the flange are formed a series of circulating-apertures 5. At the juncture of the main or body portion of the pot with the acid-chamber a series of apertures 6 are provided for the entrance of the carbonic-acid gas.

Holes as made heretofore have weakened the pots, but applicant's apertures do not do so, since the ventilating and overflow holes are combined and are formed in the thick portion of the pot below the larger portion thereof.

In practicing my invention the chamber 3 is supplied with acetic acid and the buckles are piled one upon the other in the upper part of the pot, the lower buckle resting upon the internal shoulder. The fermenting material is then placed upon the floor of the chamber, and a series of pots are partially embedded in the same. A board covering or flooring is then placed over the tops of said series of pots and fermenting material spread over the same. Successive tiers of pots and flooring are placed above the first tier, until the chamber is filled, and the operation commences.

The fermentation of the fermentable substance generates a certain amount of heat, besides generating carbonic-acid gas; the heat causes the acetic acid to vaporize, and the carbonic-acid gas passes through the apertures into the acid-chamber, where it is diffused with the acetic-acid vapor, and the diffused gas and vapor pass upward into the portion of the pot containing the buckles and out through the apertures in the upper part of the pot, thus causing a free circulation of said gas and vapor through the pots, producing a better quality of carbonate, free from acetate of lead, and lessening the expense of manufacture.

Having thus fully described my invention, what I claim as new, and desire to secure by Letters Patent, is—

1. A corroding-pot, consisting of a vessel contracted near its lower portion, to form a chamber and a support for the buckles, and provided with apertures at the juncture of the main or body portion, with the contracted portion, and with apertures in said main or body portion, below the upper edge, substantially as specified.

2. As a new article of manufacture, a corroding-pot having its lower portion contracted to form an acid-chamber and a support for the buckles, and provided with apertures between the body portion and the contracted portion, and with an external flange at its upper edge and with escape-apertures in said body portion, substantially as specified.

3. A ventilating corroding-pot having its lower portion contracted to form an acid-chamber and a support for the buckles, provided with ventilating and overflow apertures below the body portion, in combination with escape-apertures near the upper part of the body portion, substantially as specified.

4. Ventilating corroding-pots, the combination of a large body portion and a smaller body portion thereof, with an internal ledge for supporting "lead buckles" and an acid-chamber below such ledge, and a series of ventilating and overflow-holes, formed between the acid-chamber and the supporting-ledge for the buckles, substantially as specified.

In testimony whereof I affix my signature in presence of two witnesses.

FREDERICK W. BUTLER.

Witnesses:
 DAYTON A. DAYTE,
 FREDK. C. BRYAN.